United States Patent
Wang et al.

(10) Patent No.: US 12,432,720 B2
(45) Date of Patent: Sep. 30, 2025

(54) UPLINK TRANSMISSION SENDING METHOD AND DEVICE, UPLINK TRANSMISSION RECEIVING METHOD AND DEVICE, TERMINAL, SERVICE NODE, AND MEDIUM

(71) Applicant: ZTE Corporation, Shenzhen (CN)

(72) Inventors: Jianwei Wang, Shenzhen (CN); Chenchen Zhang, Shenzhen (CN); Peng Hao, Shenzhen (CN); Xingguang Wei, Shenzhen (CN); Yu Ngok Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 466 days.

(21) Appl. No.: 17/778,589

(22) PCT Filed: Nov. 2, 2020

(86) PCT No.: PCT/CN2020/125821
§ 371 (c)(1),
(2) Date: Sep. 6, 2022

(87) PCT Pub. No.: WO2021/098496
PCT Pub. Date: May 27, 2021

(65) Prior Publication Data
US 2023/0044303 A1 Feb. 9, 2023

(30) Foreign Application Priority Data
Nov. 22, 2019 (CN) .......................... 201911159025.5

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0051* (2013.01); *H04L 5/0053* (2013.01);
(Continued)

(58) Field of Classification Search
CPC ........... H04W 72/1268; H04W 72/569; H04W 72/23; H04L 5/0051
See application file for complete search history.

(56) References Cited

U.S. PATENT DOCUMENTS

2017/0118658 A1  4/2017  Hwang et al.
2019/0059057 A1*  2/2019  Peng ................... H04W 52/146
(Continued)

FOREIGN PATENT DOCUMENTS

CN  110365459 A  10/2019
CN  110391889 A  10/2019
(Continued)

OTHER PUBLICATIONS

Huawei, HiSilicon, "On switching time between 1Tx carrier and 2Tx carrier", 3GPP TSG RAN meeting #85, Newport Beach, USA, Sep. 16-20, 2019, RP-192098.
(Continued)

*Primary Examiner* — Won Tae C Kim
(74) *Attorney, Agent, or Firm* — CANTOR COLBURN LLP

(57) ABSTRACT

Provided are an uplink transmission sending method and device, an uplink transmission receiving method and device, a terminal, a service node, and a medium. The method includes: determining a sending mechanism of an uplink
(Continued)

Determine a sending mechanism of an uplink transmission according to an uplink transmit mode in the case of multiple carriers — 110

Send the uplink transmission according to the sending mechanism — 120 transmission according to an uplink transmit mode in the case of multiple carriers; and sending the uplink transmission according to the sending mechanism.

18 Claims, 2 Drawing Sheets

(51) Int. Cl.
 *H04W 72/23* (2023.01)
 *H04W 72/566* (2023.01)
(52) U.S. Cl.
 CPC ......... *H04W 72/23* (2023.01); *H04W 72/569* (2023.01); *H04L 5/0007* (2013.01)

(56) References Cited

U.S. PATENT DOCUMENTS

| | | | |
|---|---|---|---|
| 2019/0342910 | A1 | 11/2019 | Cao |
| 2020/0163059 | A1* | 5/2020 | Zhang ................. H04L 25/0226 |
| 2021/0068060 | A1* | 3/2021 | Nilsson ............... H04W 52/325 |
| 2021/0392625 | A1* | 12/2021 | Lin ....................... H04W 72/23 |
| 2022/0386337 | A1* | 12/2022 | Hao ..................... H04L 5/0048 |

FOREIGN PATENT DOCUMENTS

| | | |
|---|---|---|
| CN | 110536450 A | 12/2019 |
| CN | 111093279 A | 5/2020 |

OTHER PUBLICATIONS

International Search Report for corresponding application PCT/CN2020/125821 filed Nov. 2, 2020; Mail date Jan. 27, 2021.
Nokia, Nokia Shanghai Bell, "Uplink Tx switching between 1Tx and 2Tx carriers", 3GPP TSG RAN WG1 Meeting #98bis, Chongqing, P.R. China, Oct. 14-20, 2019, R1-1911204.
Nokia, Nokia Shanghai Bell, "Uplink Tx switching between 1Tx and 2Tx carriers", 3GPP TSG RAN WG1 Meeting #99, Reno, NV, USA, Nov. 18-22, 2019, R1-1913092.
3GPP TSG RAN meeting #85, Newport Beach, USA Sep. 16-20, 2019, RP-191794.
3GPP TSG RAN meeting #99, Reno, USA Sep. 18-22, 2019, RP-1911977.
European Search Report for corresponding application EP20890901; Nov. 20, 2023.
CATT, Impact of UL switching on RAN1 Specification, 3GPP TSG RAN WGI Meeting #99, Reno USA Nov. 18-22, 2019. R1-1912141.
Chinese Office Action for corresponding application 2019111590255; Dec. 25, 2024.
Chinese Search Report for corresponding application 2019111590255; Dec. 19, 2024.
ZTE, RAN1 impact on switch between case 1 and case 2 for two uplink carriers, 3GPP TSG RAN WG1 #98bis, Chongqing China, Aug. 14-20, 2019.

* cited by examiner

UPLINK TRANSMISSION SENDING METHOD AND DEVICE, UPLINK TRANSMISSION RECEIVING METHOD AND DEVICE, TERMINAL, SERVICE NODE, AND MEDIUM

CROSS-REFERENCES TO RELATED APPLICATIONS

This is a National Stage Application, filed under 35 U.S.C. 371, of International Patent Application No. PCT/CN2020/125821, filed on Nov. 2, 2020, which is based on and claims priority to Chinese Patent Application No. 201911159025.5 filed with the China National Intellectual Property Administration (CNIPA) on Nov. 22, 2019, the disclosure of which is incorporated herein by reference in its entirety.

This application claims priority to Chinese Patent Application No. 201911159025.5 filed with the China National Intellectual Property Administration (CNIPA) on Nov. 22, 2019, the disclosure of which is incorporated herein by reference in its entirety.

TECHNICAL FIELD

The present application relates to wireless communication networks, for example, an uplink transmission sending method and device, an uplink transmission receiving method and device, a communication node, and a medium.

BACKGROUND

In the scenarios of carrier aggregation (CA) or eNB-NR dual connectivity (EN-DC) of time-division multiplexing (TDM), the number of uplink radio frequency links or uplink transmit antennas of a terminal is limited, for example, the terminal supports at most two uplink radio frequency links or uplink transmit antennas. Thus, the terminal may need to switch a state in the process of uplink sending on multiple carriers. For example, in one state, all the uplink radio frequency links or uplink transmit antennas of the terminal are used for a transmission on one carrier; and in the other state, different uplink radio frequency links or uplink transmit antennas of the terminal are used for transmissions on different carriers, separately. The state switching of the terminal causes an additional processing delay. However, a serving node cannot acquire when the state switching of the terminal occurs and causes the processing delay, resulting in inconsistency between the processing at the serving node side and the processing at the terminal side and affecting communication reliability and efficiency.

SUMMARY

The present application provides an uplink transmission sending method and device, a communication node, and a medium, so as to improve communication reliability and efficiency.

An embodiment of the present application provides an uplink transmission sending method including the steps below.

A sending mechanism of an uplink transmission is determined according to an uplink transmit mode in the case of multiple carriers.

The uplink transmission is sent according to the sending mechanism.

An embodiment of the present application further provides an uplink transmission receiving method including the steps below.

Scheduling information is sent, where the scheduling information is used for scheduling a terminal to send an uplink transmission according to an uplink transmit mode in the case of multiple carriers. The uplink transmission is received.

An embodiment of the present application further provides an uplink transmission sending device including a sending mechanism determination module and a sending module.

The sending mechanism determination module is configured to determine a sending mechanism of an uplink transmission according to an uplink transmit mode in the case of multiple carriers.

The sending module is configured to send the uplink transmission according to the sending mechanism.

An embodiment of the present application further provides an uplink transmission receiving device including a scheduling module and a receiving module.

The scheduling module is configured to send scheduling information, where the scheduling information is used for scheduling a terminal to send an uplink transmission according to an uplink transmit mode in the case of multiple carriers.

The receiving module is configured to receive the uplink transmission.

An embodiment of the present application further provides a terminal including one or more processors and a storage device.

The storage device is configured to store one or more programs.

The one or more programs are executed by the one or more processors to cause the one or more processors to perform the preceding uplink transmission sending method.

An embodiment of the present application further provides a serving node including one or more processors and a storage device.

The storage device is configured to store one or more programs.

The one or more programs are executed by the one or more processors to cause the one or more processors to perform the preceding uplink transmission receiving method.

An embodiment of the present application further provides a computer-readable storage medium, which is configured to store a computer program which, when executed by a processor, causes the processor to perform the preceding uplink transmission sending method or the preceding uplink transmission receiving method.

DETAILED DESCRIPTION

Figure 1:
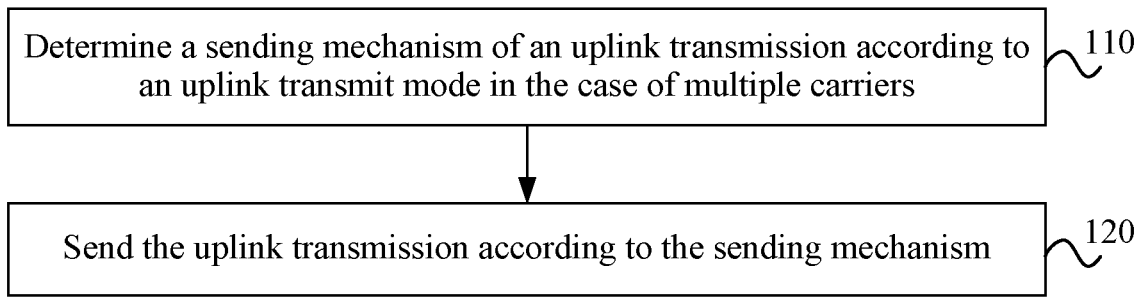
FIG. 1 is a flowchart of an uplink transmission sending method according to an embodiment.

The present application is described hereinafter in conjunction with drawings and embodiments. It is to be understood that the embodiments described herein are intended to explain the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

In a CA or DC scenario, a terminal may send uplink channels or signals on multiple uplink carriers. In the case where the terminal has a limited radio frequency capability, the number of radio frequency links or transmit antennas supported by the terminal are limited. If the uplink channels or signals need to be sent on all the multiple uplink carriers, the terminal needs to allocate supportable radio frequency links or transmit antennas to different uplink carriers. The terminal might operate in different uplink transmit modes. For example, in one state, all uplink radio frequency links or uplink transmit antennas of the terminal are used for a transmission on one carrier; and in the other state, different uplink radio frequency links or uplink transmit antennas of the terminal are used for transmissions on different carriers, separately. When the terminal switches between different uplink transmit modes, the processing of a serving node is inconsistent with that of the terminal, affecting communication efficiency and reliability.

An embodiment of the present application provides an uplink transmission sending method, where a terminal determines a sending mechanism according to an uplink transmit mode so that the terminal is limited to a certain extent in a process of sending an uplink transmission and will not switch the sending mechanism arbitrarily. In this manner, a serving node and the terminal maintain processing consistency, ensuring the stability in sending the uplink transmission and improving communication efficiency and reliability. In the following embodiments, the serving node may be a base station and the terminal may be a user equipment (UE).

FIG. 1 is a flowchart of an uplink transmission sending method according to an embodiment. As shown in FIG. 1, the method provided in the embodiment includes steps 110 and 120.

In step 110, a sending mechanism of an uplink transmission is determined according to an uplink transmit mode in the case of multiple carriers.

In step 120, the uplink transmission is sent according to the sending mechanism.

In the embodiment, for a terminal with a limited number of uplink sending radio frequency links, uplink transmit antennas, or sounding reference signal (SRS) resource ports, the terminal may receive configuration information from a serving node or determine an uplink transmit mode corresponding to an uplink transmission in each time unit according to configuration information predefined by a system, so as to determine a method for allocating uplink transmit resources and thus determine the sending mechanism, and the terminal may send a corresponding uplink transmission using an uplink transmit resource. On this basis, a state of the terminal will not be switched arbitrarily due to a limitation of the uplink transmit mode. Additionally, the uplink transmit mode is determined according to the configuration information, and the serving node may also acquire, according to the configuration information, which uplink transmit mode the terminal operates in and how the terminal sends the uplink transmission so that the serving node and the terminal side maintain processing consistency.

In an embodiment, the method further includes the step below.

An uplink transmit mode corresponding to an uplink transmission scheduled by a physical downlink control channel (PDCCH) is determined according to information in the PDCCH for scheduling the uplink transmission.

In an embodiment, the uplink transmit mode is a mode in which uplink transmit resources are allocated among multiple carriers or carrier groups. Where the uplink transmit resources include at least one of radio frequency links, transmit antennas, or antenna ports supported by an SRS resource.

In an embodiment, the uplink transmit mode includes a first mode and a second mode, where in the first mode, the uplink transmit resources are allocated to multiple uplink carriers or carrier groups; and in the second mode, the uplink transmit resources are all allocated to one uplink carrier or carrier group.

In an embodiment, in the first mode, the uplink transmit resources are equally allocated to the multiple uplink carriers or carrier groups.

For example, the terminal supports at most two radio frequency links or two transmit antennas. In the case where the terminal supports two uplink carriers, the terminal may operate in two uplink transmit modes.

(1) The two radio frequency links or two transmit antennas are used for uplink transmissions on the two uplink carriers, separately.

(2) Both the two radio frequency links are used for an uplink transmission on one of the two uplink carriers.

The two uplink transmit modes may also be represented by the number of ports supported by one SRS resource. For example, one SRS resource supports at most two ports. In the case where the terminal supports two uplink carriers, the terminal may operate in two uplink transmit modes.

(1) Each of the two uplink carriers supports an uplink transmission in which one port is supported by the SRS resource.

(2) One of the two uplink carriers supports uplink transmissions in which at most two ports are supported by the SRS resource, and the other of the two uplink carriers supports no uplink transmission.

The switching between the two radio frequency link modes or between the two transmit antenna modes or between the two SRS resource port modes may result in a processing delay.

In an embodiment, the method further includes: determining the uplink transmit mode according to configuration information of a reference configuration.

In the embodiment, for the terminal with the limited number of uplink sending radio frequency links, uplink transmit antennas, or SRS resource ports, in the case where the terminal supports EN-DC, the serving node configures a reference configuration for a Long-Term Evolution (LTE) cell group (CG), and the terminal may determine the uplink transmit mode according to the reference configuration, thereby avoiding a conflict between uplink transmissions of the terminal on the LTE CG and a New Radio (NR) CG. The reference configuration has to be configured for a terminal that does not support dynamic power sharing.

In an embodiment, the step of determining the uplink transmit mode according to the configuration information of the reference configuration includes the step below. The uplink transmit mode is determined to be the first mode for a time unit configured to be uplink in the reference configuration, and the uplink transmit mode is determined to be the second mode for a time unit configured to be non-uplink in the reference configuration.

Alternatively, the uplink transmit mode is determined to be the second mode for the time unit configured to be uplink in the reference configuration, and the uplink transmit mode is determined to be the first mode for the time unit configured to be non-uplink in the reference configuration. The time unit includes at least one of a subframe, a slot, or an orthogonal frequency-division multiplexing (OFDM) symbol.

In the embodiment, the reference configuration or the uplink transmit mode is predefined by the system or semi-statically configured by the serving node for the terminal. For example, there are two uplink transmit modes, the time unit configured to be uplink in the reference configuration corresponds to the first mode, and the time unit configured to be non-uplink in the reference configuration corresponds to the second mode.

First Example

For example, in the case where the terminal supports the EN-DC, for a subframe configured to be uplink (denoted as "U") in the reference configuration, the terminal may send an uplink transmission on the LTE CG and sends no uplink transmission on the NR CG. For a subframe configured to be non-uplink (non-"U") in the reference configuration, the terminal sends no uplink transmission on the LTE CG and may send an uplink transmission on the NR CG.

In the first mode, one radio frequency link or transmit antenna of the terminal is applied to the NR CG, and the other radio frequency link or transmit antenna of the terminal is applied to the LTE CG. Alternatively, in the first mode, one radio frequency link or transmit antenna of the terminal is applied to the NR CG that supports the SRS resource with one port, and the other radio frequency link or transmit antenna of the terminal is applied to the LTE CG that supports the SRS resource with one port.

In the first mode, the sending mechanism of the terminal includes sending an uplink transmission through one port on the LTE CG and sending no uplink transmission on the NR CG.

In the second mode, both the two radio frequency links or two transmit antennas of the terminal are applied to the NR CG or applied to the NR CG that supports the SRS resource with at most two ports.

In the second mode, the sending mechanism of the terminal includes sending an uplink transmission through two ports or one port on the NR CG and sending no uplink transmission on the LTE CG.

Second Example

For example, in the case where the terminal supports the EN-DC, for the subframe configured to be uplink (denoted as "U") in the reference configuration, the terminal may send an uplink transmission on the LTE CG and may also send an uplink transmission on the NR CG. For the subframe configured to be non-uplink (non-"U") in the reference configuration, the terminal sends no uplink transmission on the LTE CG and may send an uplink transmission on the NR CG.

In the first mode, one radio frequency link or transmit antenna of the terminal is applied to the NR CG, and the other radio frequency link or transmit antenna of the terminal is applied to the LTE CG. Alternatively, in the first mode, one radio frequency link or transmit antenna of the terminal is applied to the NR CG that supports the SRS resource with one port, and the other radio frequency link or transmit antenna of the terminal is applied to the LTE CG that supports the SRS resource with one port.

In the first mode, the sending mechanism of the terminal includes: sending an uplink transmission through one port on the LTE CG; sending an uplink transmission through one port on the NR CG; or sending an uplink transmission through one port on the LTE CG and sending an uplink transmission through one port on the NR CG, where time domain resources of the uplink transmissions sent on the LTE CG and the NR CG completely or partially overlap. In the second mode, both the two radio frequency links or two transmit antennas of the terminal are applied to the NR CG or applied to the NR CG that supports the SRS resource with at most two ports.

In the second mode, the sending mechanism of the terminal includes sending uplink transmissions through two ports on the NR CG and sending no uplink transmission on the LTE CG.

Third Example

For example, in the case where the terminal supports the EN-DC, for the subframe configured to be uplink (denoted as "U") in the reference configuration, the terminal sends an uplink transmission on the LTE CG and may also send an uplink transmission on the NR CG. For the subframe configured to be non-uplink (non-"U") in the reference configuration, the terminal sends no uplink transmission on the LTE CG and may send an uplink transmission on the NR CG. In the first mode, one radio frequency link or transmit antenna of the terminal is applied to the NR CG, and the other radio frequency link or transmit antenna of the terminal is applied to the LTE CG. Alternatively, in the first mode, one radio frequency link or transmit antenna of the terminal is applied to the NR CG that supports the SRS resource with one port, and the other radio frequency link or transmit antenna of the terminal is applied to the LTE CG that supports the SRS resource with one port.

In the first mode, the sending mechanism of the terminal includes: sending an uplink transmission through one port on the LTE CG; or sending an uplink transmission through one port on the LTE CG and sending an uplink transmission through one port on the NR CG, where time domain resources of the uplink transmissions sent on the LTE CG and the NR CG completely or partially overlap.

In the second mode, both the two radio frequency links or two transmit antennas of the terminal are applied to the NR CG or applied to the NR CG that supports the SRS resource with at most two ports.

In the second mode, the sending mechanism of the terminal includes sending an uplink transmission through two ports or one port on the NR CG and sending no uplink transmission on the LTE CG.

Fourth Example

For example, in the case where the terminal supports the EN-DC, for the subframe configured to be uplink (denoted as "U") in the reference configuration, the terminal may send an uplink transmission on the LTE CG and may also send an uplink transmission on the NR CG. For the subframe configured to be non-uplink (non-"U") in the reference configuration, the terminal sends no uplink transmission on the LTE CG and may send an uplink transmission on the NR CG.

In the first mode, one radio frequency link or transmit antenna of the terminal is applied to the NR CG, and the other radio frequency link or transmit antenna of the terminal is applied to the LTE CG. Alternatively, in the first mode, one radio frequency link or transmit antenna of the terminal is applied to the NR CG that supports the SRS resource with one port, and the other radio frequency link or transmit antenna of the terminal is applied to the LTE CG that supports the SRS resource with one port.

In the first mode, the sending mechanism of the terminal includes: sending an uplink transmission through one port on the LTE CG; sending an uplink transmission through one port on the LTE CG and sending an uplink transmission through one port on the NR CG, where time domain resources of the uplink transmissions sent on the LTE CG and the NR CG completely or partially overlap;

or sending an uplink transmission through one port on the NR CG, where the uplink transmission is a physical uplink shared channel (PUSCH).

In the second mode, both the two radio frequency links or two transmit antennas of the terminal are applied to the NR CG or applied to the NR CG that supports the SRS resource with at most two ports.

In the second mode, the sending mechanism of the terminal includes: sending uplink transmissions through two ports on the NR CG; or sending an uplink transmission through one port on the NR CG, where the uplink transmission is a PUSCH; and sending no uplink transmission on the LTE CG.

In the preceding examples, the first mode and the second mode may be interchanged. The first example is illustrated below.

In the first mode, both the two radio frequency links or two transmit antennas of the terminal are applied to the NR CG or applied to the NR CG that supports the SRS resource with at most two ports.

In the second mode, one radio frequency link or transmit antenna of the terminal is applied to the NR CG, and the other radio frequency link or transmit antenna of the terminal is applied to the LTE CG. Alternatively, in the second mode, one radio frequency link or transmit antenna of the terminal is applied to the NR CG that supports the SRS resource with one port, and the other radio frequency link or transmit antenna of the terminal is applied to the LTE CG that supports the SRS resource with one port.

In an embodiment, a certain mapping relationship exists between the reference configuration, the transmit mode, and the sending mechanism, where the mapping relationship may be configured by the serving node or predefined by the system. The terminal associates the reference configuration, the transmit mode, and the sending mechanism. For example, for the subframe configured to be uplink in the reference configuration, the terminal works in the first mode. For the subframe configured to be non-uplink in the reference configuration, the terminal works in the second mode to send the uplink transmission using the corresponding sending mechanism.

In an embodiment, the reference configuration may be semi-statically configured for or indicated to the terminal by an LTE serving node, and an NR serving node may also acquire all or part of the configuration information of the reference configuration by interacting with the LTE serving node. Therefore, both the terminal and the serving node can acquire when the switching between the first mode and the second mode occurs to acquire when a switching delay exists. The serving node can schedule the terminal and receive the uplink transmission according to the switching delay, thereby maintaining the processing consistency and improving the communication efficiency and reliability.

The uplink transmission in the preceding embodiments may be any one of a PUSCH, a physical uplink control channel (PUCCH), an SRS, a physical random access channel (PRACH), or a third message (msg3) in a PRACH contention mechanism.

The CG in the preceding embodiments may contain one or more component carriers (CCs).

In the case where the terminal supports CA, the method in the preceding embodiments is also applicable. For example, in the preceding examples, the LTE CG may refer to one CC and the NR CG may refer to another CC.

In an embodiment, the method further includes: determining that uplink transmissions within one time unit or multiple consecutive time units correspond to the same uplink transmit mode, where the time unit includes at least one of the subframe, the slot, or the OFDM symbol.

For example, for the terminal with the limited number of uplink sending radio frequency links, uplink transmit antennas, or SRS resource ports, if the terminal supports the EN-DC, the CA, or supplementary uplink (SUL), the following two modes are predefined by the system or semi-statically configured by the serving node for the terminal.

In the first mode, one radio frequency link or transmit antenna of the terminal is applied to CG1 or CC1, and the other radio frequency link or transmit antenna of the terminal is applied to CG2 or CC2. Alternatively, in the first mode, one radio frequency link or transmit antenna of the terminal is applied to CG1 or CC1 that supports the SRS resource with one port, and the other radio frequency link or transmit antenna of the terminal is applied to CG2 or CC2 that supports the SRS resource with one port.

In the second mode, both the two radio frequency links or two transmit antennas of the terminal are applied to CG2 or CC2 or applied to CG2 or CC2 that supports the SRS resource with at most two ports.

In the embodiment, for the terminal working in the scenario of EN-DC, CG2 refers to the NR CG, CC2 refers to an NR CC, CG1 refers to the LTE CG, and CC1 refers to an LTE CC.

In the embodiment, to prevent the terminal from frequent switching between uplink transmit modes which causes the processing delay, it may be predefined by the system or semi-statically configured by the serving node that the terminal will not switch within a time period T. For example, a preset time T includes one time unit or multiple consecutive time units, where the uplink transmissions within the one time unit or the multiple consecutive time units correspond to the same uplink transmit mode.

In an embodiment, the method further includes the step below.

For the uplink transmissions within the one time unit or the multiple consecutive time units, the uplink transmit mode is determined to be an uplink transmit mode received before a mode decision time point and corresponding to an uplink transmission scheduled by the PDCCH or configured via higher-layer signaling.

In an embodiment, a position of the mode decision time point is a preset number of OFDM symbols earlier than a starting OFDM symbol position of the uplink transmissions in the one time unit or the multiple consecutive time units; or the position of the mode decision time point is the preset number of OFDM symbols earlier than a starting OFDM symbol position of the one time unit or the multiple consecutive time units. The preset number of OFDM symbols is predefined by the system or configured by the serving node via the higher-layer signaling for the terminal, for example, may be the switching delay between different uplink sending modes.

In an embodiment, the method further includes at least one of the steps below.

The uplink transmit mode corresponding to the uplink transmissions in the one time unit or the multiple consecutive time units is determined to be an uplink transmit mode corresponding to an uplink transmission having an earliest starting transmission time and scheduled by the PDCCH, activated by the PDCCH or configured via the higher-layer signaling.

The uplink transmit mode corresponding to the uplink transmissions in the one time unit or the multiple consecutive time units is determined to be an uplink transmit mode corresponding to an uplink transmission having a highest priority and scheduled by the PDCCH, activated by the PDCCH or configured via the higher-layer signaling. The time unit includes at least one of the subframe, the slot, or the OFDM symbol.

In the embodiment, in the case where the uplink transmission requirements of the terminal on two CGs or two CCs conflict, the terminal may be guaranteed not to switch within the time period T in at least one of the manners below. For ease of description, it is assumed in the embodiment that an uplink transmission 1 needs to be sent on CG1 or CC1 and an uplink transmission 2 needs to be sent on CG2 or CC2. Actually, two uplink transmissions may be sent on different CCs within one CG. The time period T refers to one time unit or multiple consecutive time units, for example, may be one time unit whose transmission direction is uplink or multiple consecutive time units whose transmission directions are uplink, which are semi-statically configured by the serving node. Manner one: Both the uplink transmission 1 and the uplink transmission 2 are sent within the time period T, where the time period T is the one time unit or the multiple consecutive time units configured by the serving node, and the time unit is at least one of the subframe, the slot, or the OFDM symbol. The terminal determines that the transmit mode within the time period T is an uplink transmit mode corresponding to an uplink transmission with an earlier starting sending time. For example, if the starting sending time of the uplink transmission 1 is earlier than that of the uplink transmission 2, an uplink transmit mode corresponding to the uplink transmission 1 is determined as the uplink transmit mode supported by the terminal within the time period T, that is, the terminal also follows the uplink transmit mode corresponding to the uplink transmission 1 in the process of sending the uplink transmission 2 or the terminal may delay or cancel sending the uplink transmission 2.

Manner two: Both the uplink transmission 1 and the uplink transmission 2 are sent within the time period T, and the terminal determines the uplink transmit mode supported by the terminal within the time period T according to a priority of the uplink transmission. For example, if the uplink transmission 1 has a higher priority than the uplink transmission 2, the terminal supports only the uplink transmit mode corresponding to the uplink transmission 1 within the time period T, and the terminal sends the uplink transmission 1 in the uplink transmit mode corresponding to the uplink transmission 1 and may send the uplink transmission 2 in the same uplink transmit mode or cancel or delay sending the uplink transmission 2.

In an embodiment, priorities of the uplink transmissions satisfy at least one of the following: An uplink transmission scheduled or activated by the PDCCH has a higher priority than an uplink transmission configured via the higher-layer signaling, where the uplink transmission scheduled or activated by the PDCCH includes at least one of a PUSCH scheduled or activated by the PDCCH, a PUCCH scheduled by the PDCCH, or an SRS scheduled by the PDCCH, and the uplink transmission configured via the higher-layer signaling includes at least one of a PUSCH, PUCCH, PRACH, or SRS whose scheduling information is delivered via the higher-layer signaling. An uplink transmission scheduled or activated in a downlink control information (DCI) format A has a higher priority than an uplink transmission scheduled or activated in a DCI format B, where each of the DCI format A and the DCI format B includes at least one of a DCI format 0_0, a DCI format 0_1, or a DCI format 0_2.

An uplink transmission scheduled or activated by a PDCCH scrambled with a radio network temporary identity (RNTI) A has a higher priority than an uplink transmission scheduled or activated by a PDCCH scrambled with an RNTI B.

An uplink transmission carrying uplink control information (UCI) has a higher priority than an uplink transmission carrying no UCI, where the uplink transmission includes an uplink physical channel.

For the uplink transmission configured via the higher-layer signaling, a PUCCH configured via the higher-layer signaling has a higher priority than a PUSCH configured via the higher-layer signaling.

For the uplink transmission configured via the higher-layer signaling, a PRACH configured via the higher-layer signaling has a higher priority than the PUSCH configured via the higher-layer signaling.

For the uplink transmission configured via the higher-layer signaling, the PRACH configured via the higher-layer signaling has a higher priority than the PUCCH configured via the higher-layer signaling.

For the uplink transmission configured via the higher-layer signaling, the PUCCH configured via the higher-layer signaling has a higher priority than an SRS configured via the higher-layer signaling.

For the uplink transmission configured via the higher-layer signaling, the PUSCH configured via the higher-layer signaling has a higher priority than the SRS configured via the higher-layer signaling.

The uplink transmission configured via the higher-layer signaling includes a periodic transmission and a semi-persistent transmission.

In an embodiment, the method further includes at least one of the steps below.

The uplink transmit mode corresponding to the uplink transmissions within the one time unit or the multiple consecutive time units is determined.

In the case where an initial uplink transmit mode of the uplink transmission is inconsistent with the determined uplink transmit mode, the uplink transmit mode of the uplink transmission is changed to the determined uplink transmit mode, or sending the uplink transmission is cancelled or delayed.

Uplink transmissions corresponding to different transmit modes are not sent within the one time unit or the multiple consecutive time units.

In the embodiment, the terminal may determine the uplink transmit mode corresponding to the uplink transmissions within the one time unit or the multiple consecutive time units according to the reference configuration, the preset number of OFDM symbols predefined by the system or configured by the serving node via the higher-layer signaling, the starting sending time or the priority of the uplink transmission, or the like. For the process, reference may be made to any one of the preceding embodiments. On this basis, if the initial uplink transmit mode of the uplink transmission is inconsistent with the uplink transmit mode determined by the terminal for the uplink transmissions within the one time unit or the multiple consecutive time units, the terminal may change the uplink transmit mode of the uplink transmission to the uplink transmit mode determined by the preceding methods or cancel or delay sending the uplink transmission.

In the case where the uplink transmit mode corresponding to the one time unit or the multiple consecutive time units is different from an uplink transmit mode corresponding to one time unit or multiple consecutive time units previous to and closest to the one time unit or the multiple consecutive time units, a mode switching delay exists between the one time unit or the multiple consecutive time units and the one time unit or the multiple consecutive time units previous to and closest to the one time unit or the multiple consecutive time units.

In an embodiment, in a case where the mode switching delay exists, the uplink transmissions within the one time unit or the multiple consecutive time units are sent after the mode switching delay. The mode switching delay is earlier than a starting OFDM symbol of the one time unit or the multiple consecutive time units and specifically, may be the preset number of OFDM symbols earlier. Alternatively, the mode switching delay is earlier than a starting OFDM symbol of an uplink transmission sent earliest within the one time unit or the multiple consecutive time units and specifically, may be the preset number of OFDM symbols earlier.

In an embodiment, the method further includes at least one of the steps below.

In the case where the uplink transmission is sent on a first cell group (denoted as CG1) or a first component carrier (denoted as CC1) within the one time unit or the multiple consecutive time units, the uplink transmit mode corresponding to the one time unit or the multiple consecutive time units is determined to be the first mode.

In the case where a first type uplink transmission is sent on a second cell group (denoted as CG2) or a second component carrier (denoted as CC2) within the one time unit or the multiple consecutive time units, the uplink transmit mode corresponding to the one time unit or the multiple consecutive time units is determined to be the first mode.

In the case where a second type uplink transmission is sent on CG2 or CC2 within the one time unit or the multiple consecutive time units, the uplink transmit mode corresponding to the one time unit or the multiple consecutive time units is determined to be the second mode.

In an embodiment, it is likely that mode switching occurs and the switching delay exists between two UL phases, or it is likely that no mode switching occurs and no switching delay exists between two UL phases. One UL phase refers to one uplink time unit or multiple consecutive uplink time units.

In an embodiment, the terminal determines whether the mode switching occurs between two UL phases by the following method: if the uplink transmission is sent on CG1 or CC1 within a previous UL phase or the first type uplink transmission is sent on CG2 or CC2 within the previous UL phase, the second type uplink transmission needs to be sent on CG2 or CC2 in a next UL phase; then, the mode switching occurs and the switching delay exists between the previous UL phase and the next UL phase. The second type uplink transmission includes at least one of: an uplink transmission to be sent with two radio frequency links; an uplink transmission to be sent with two antennas; or an uplink transmission corresponding to an SRS resource with two ports.

In an embodiment, the first type uplink transmission and the second type uplink transmission may be interchanged.

In an embodiment, to avoid the mode switching within one UL phase, the terminal does not expect the serving node to schedule uplink transmissions corresponding to different modes within the same UL phase.

The uplink transmission corresponding to the first mode includes at least one of: an uplink transmission sent on CG1 or CC1 or an uplink transmission sent on CG2 or CC2 through one port. The first type uplink transmission includes at least one of: an uplink transmission to be sent with one radio frequency link; an uplink transmission to be sent with one antenna; or an uplink transmission corresponding to an SRS resource with one port.

The uplink transmission corresponding to the second mode is an uplink transmission sent on CG2 or CC2 through two port.

In an embodiment, the terminal determines a mode corresponding to a target UL phase and then determines whether the mode corresponding to the target UL phase is the same as a mode corresponding to a previous UL phase, so as to determine whether the mode switching occurs and the switching delay exists between the previous UL phase and the target UL phase. If the mode within the previous UL phase is different from the mode within the target UL phase, the switching delay exists between the two UL phases, which is embodied in that the terminal needs to ensure one switching delay before sending the uplink transmission within the target UL phase.

A specific determination method is as follows: the terminal determines the mode within the target UL phase according to a sending manner for the uplink transmission scheduled by the PDCCH or the uplink transmission configured via the higher-layer signaling and received before or on an OFDM symbol that is the preset number of OFDM symbols earlier than a starting time unit of the target UL phase or according to a sending manner of an uplink transmission to be sent earliest within the target UL phase. The uplink transmission scheduled by the PDCCH or the uplink transmission configured via the higher-layer signaling refers to an uplink transmission whose transmission time is within the target UL phase or an uplink transmission whose starting transmission time is within the target UL phase. The preset number of OFDM symbols may be equal to an inter-mode switching delay predefined by the system or semi-statically configured by a base station.

In an embodiment, if multiple uplink transmissions exist within one UL phase, the multiple uplink transmissions may correspond to different modes, the terminal needs to determine, according to a priority rule, the mode supported within the UL phase to be a mode corresponding to which uplink transmission or a mode corresponding to a combination of which uplink transmissions.

In the embodiment, the priority rule includes at least one of the rules below.

An uplink transmission 1 scheduled by the PDCCH or configured via the higher-layer signaling and sent on CG1 or CC1 has a higher priority than an uplink transmission 2 of the second type scheduled by the PDCCH or configured via the higher-layer signaling and sent on CG2 or CC2. The uplink transmission 1 may specifically be at least one of a PRACH, a PUCCH, a PUSCH including UCI, a PUSCH, or an SRS. The uplink transmission 2 may be at least one of the PUSCH including UCI, the PUSCH, the SRS, or the PRACH.

An uplink transmission 1 of the first type scheduled by the PDCCH or configured via the higher-layer signaling and sent on CG1 or CC1 has a higher priority than the uplink transmission 2 of the second type scheduled by the PDCCH or configured via the higher-layer signaling and sent on CG2 or CC2. The uplink transmission 1 may specifically be at least one of the PRACH, the PUCCH, the PUSCH including UCI, the PUSCH, or the SRS. The uplink transmission 2 may be at least one of the PUSCH including UCI, the PUSCH, the SRS, or the PRACH.

A combination 1 includes the uplink transmission 1 of the first type scheduled by the PDCCH or configured via the higher-layer signaling and sent on CG1 or CC1 and an uplink transmission 2 of the first type scheduled by the PDCCH or configured via the higher-layer signaling and sent on CG2 or CC2. The combination 1 has a higher priority than an uplink transmission 3 of the second type scheduled by the PDCCH or configured via the higher-layer signaling and sent on CG2 or CC2. Time domain resources of the uplink transmission 1 and the uplink transmission 2 may completely or partially overlap. Each of the uplink transmission 1 and the uplink transmission 2 may be at least one of the PRACH, the PUCCH, the PUSCH including UCI, the PUSCH, or the SRS. The uplink transmission 3 may be at least one of the PUSCH including UCI, the PUSCH, the SRS, or the PRACH.

In an embodiment, the base station sends the PDCCH to schedule the terminal to send an uplink transmission on a certain CG or CC. The terminal may determine an uplink sending mode corresponding to the scheduled uplink transmission according to an indication of a certain domain in the PDCCH. For example, different values indicated by an SRS resource indicator in the PDCCH correspond to different uplink sending modes of the uplink transmission. In another example, different values indicated by precoding information and the number of layers in the PDCCH correspond to different uplink sending modes of the uplink transmission. Further, the uplink sending mode of the uplink transmission may be determined according to a transmit preceding matrix indicator (TPMI). When a value of the TPMI belongs to a set 1, the uplink transmission scheduled by the PDCCH corresponds to the first mode. When the value of TPMI belongs to a set 2, the uplink transmission scheduled by the PDCCH corresponds to the second mode.

In an embodiment, the initial uplink transmit mode of the uplink transmission is determined according to configuration information via the higher-layer signaling or scheduling indication information in the PDCCH.

In an embodiment, the method further includes: determining the sending mechanism according to configuration information, where the sending mechanism includes supporting, within one CG and within one time unit, an uplink transmission to be sent on one CC, where the uplink transmission includes the PUCCH.

In the embodiment, the uplink transmission includes the PUCCH. In the scenario of CA, the serving node configures only one PUCCH group for the terminal within one CG, that is, only one CC can be used for sending the PUCCH. A specific implementation method may be as follows: within one CG, the serving node configures configuration information (Config) of the PUCCH only for a bandwidth part (BWP) of a primary cell (Pcell) and does not configure the Config of the PUCCH for a BWP of another cell, thereby avoiding frequent switching between uplink transmit modes.

In an embodiment, the method further includes: determining the sending mechanism according to the configuration information, where the sending mechanism includes that a delay between an ending symbol of a previously sent uplink transmission and a starting symbol of a subsequently sent uplink transmission is greater than or equal to a set number of time units, where the time unit is the subframe, the slot, a symbol, a microsecond, or a millisecond. For example, the set number of time units here may be the switching delay between different uplink sending modes, which is predefined by the system or semi-statically configured by the serving node.

In the embodiment, for the terminal with the limited number of uplink sending radio frequency links, uplink transmit antennas, or SRS resource ports, in the case where the terminal supports the EN-DC, CA, or SUL, for example, the serving node dynamically schedules or semi-statically configures two uplink transmission for the terminal, that is, the uplink transmission 1 and the uplink transmission 2 are configured. If the number of ports for the uplink transmission 1 is different from the number of ports for the uplink transmission 2 and the switching delay between uplink transmit modes, which is predefined by the system or semi-statically configured by the serving node for the terminal, is T1, the serving node needs to ensure that a delay between an ending time unit of the uplink transmission 1 and a starting time unit of the uplink transmission 2 cannot be less than T1.

If the uplink transmissions to be sent by the terminal do not satisfy this condition, the terminal may send only one of the uplink transmission 1 or the uplink transmission 2, and which one is to be sent may be determined by the method in the preceding embodiments. For example, only the uplink transmission with the earlier starting sending time is sent, or only the uplink transmission with the higher priority is sent. Additionally, the terminal may also change the uplink transmit mode of the uplink transmission 1 or the uplink transmission 2, so as to ensure that the uplink transmission 1 and the uplink transmission 2 are sent in the same uplink transmit mode, which may be implemented in at least one of the manners below.

The number of ports for the uplink transmission 1 or the uplink transmission 2 is changed.

The number of transmit antennas for the uplink transmission 1 or the uplink transmission 2 is changed.

A manner of mapping ports to transmit antennas for the uplink transmission 1 or the uplink transmission 2 is changed.

The number of SRS resource ports for the uplink transmission 1 or the uplink transmission 2 is changed.

An SRS resource for the uplink transmission 1 or the uplink transmission 2 is changed. In the embodiment, a preset time T1 may include one uplink time unit or multiple consecutive uplink time units determined according to the reference configuration, and the time unit may be the OFDM symbol, the slot, the subframe, or the like.

In an embodiment, the sending mechanism includes target information of the uplink transmission;

where the target information includes at least one of the number of transmit ports, a sequence number of a transmit port, a method for mapping transmit ports to transmit antennas, a method for mapping transmit ports to radio frequency links, or a method for mapping transmit ports to SRS resource ports.

In an embodiment, the method for mapping transmit ports to transmit antennas includes: mapping one transmit port to a specified number of transmit antennas; the method for mapping transmit ports to radio frequency links includes: mapping one transmit port to a specified number of radio frequency links; and the method for mapping transmit ports to SRS resource ports includes: mapping one transmit port to a specified number of SRS resource ports.

In the embodiment, in the case where the terminal determines to send one of the uplink transmission 1 or the uplink transmission 2 in a certain uplink transmit mode, for example, send the uplink transmission 1 in the certain uplink transmit mode, if the terminal is also to send the uplink transmission 2, a transmit port for the uplink transmission 2 is associated with a transmit port for the uplink transmission 1, where the association may be an association between numbers of ports, an association between transmit antennas to which the ports are mapped, or an association between radio frequency links to which the ports are mapped.

For example, the number of ports for the uplink transmission 2 is determined according to the number of ports for the uplink transmission 1, where the uplink transmission 2 needs to be sent by using the same number of ports as the uplink transmission 1. In another example, the method for mapping ports to transmit antennas for the uplink transmission 2 is determined according to the method for mapping ports to transmit antennas for the uplink transmission 1. In another example, the method for mapping ports to radio frequency links for the uplink transmission 2 is determined according to the method for mapping ports to radio frequency links for the uplink transmission 1.

In another example, the method for mapping ports to SRS resource ports for the uplink transmission 2 is determined according to the method for mapping ports to SRS resource ports for the uplink transmission 1.

Figure 2:
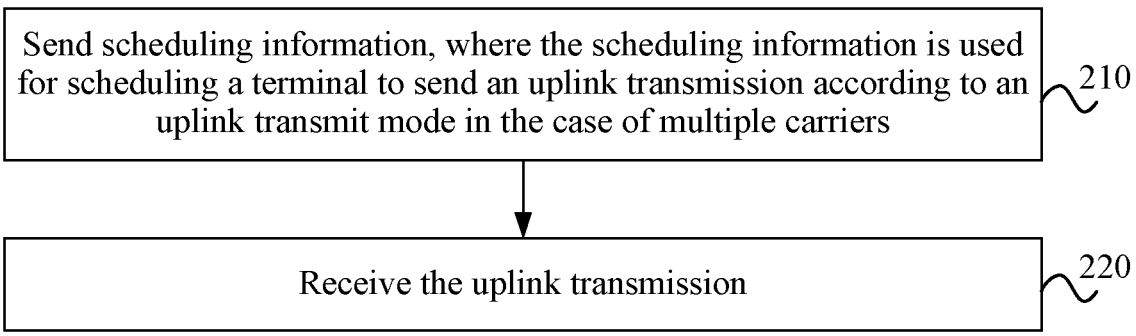
FIG. 2 is a flowchart of an uplink transmission receiving method according to an embodiment.

FIG. 2 is a flowchart of an uplink transmission receiving method according to an embodiment. As shown in FIG. 2, the method provided in the embodiment includes steps 210 and 220.

In step 210, scheduling information is sent, where the scheduling information is used for scheduling a terminal to send an uplink transmission according to an uplink transmit mode in the case of multiple carriers.

In step 220, the uplink transmission is received.

In the uplink transmission receiving method in the embodiment, after a serving node schedules the terminal, the terminal determines how to send the uplink transmission according to the uplink transmit mode. The process of the terminal sending the uplink transmission is limited by the uplink transmit mode without frequent switching so that the serving node can stably receive the uplink transmission sent by the terminal, ensuring the consistency between two ends and improving communication efficiency and reliability.

In an embodiment, the method further includes: configuring a reference configuration, where the reference configuration has a mapping relationship with the uplink transmit mode.

In the embodiment, the serving node further configures the reference configuration and the reference configuration has the mapping relationship with the uplink transmit mode so that the serving node can limit the sending of the uplink transmission by the terminal through the configured reference configuration, avoiding the frequent switching. For example, in the case where the terminal supports EN-DC, for a subframe configured to be uplink (denoted as "U") by the serving node in the reference configuration, it may be limited that the terminal sends the uplink transmission on an LTE CG and sends no uplink transmission on an NR CG. For a subframe configured to be non-uplink (non-"U") by the serving node in the reference configuration, it may be limited that the terminal sends no uplink transmission on the LTE CG and may send the uplink transmission on the NR CG. For the limitations of the reference configuration configured by the serving node on the uplink transmit mode in which the terminal sends the uplink transmission in various cases, reference may be made to any one of the preceding embodiments.

In an embodiment, the reference configuration may be predefined by a system, and the mapping relationship between the reference configuration and the uplink transmit mode may also be predefined by the system.

In an embodiment, the method further includes at least one of the steps below. It is configured that uplink transmissions within one time unit or multiple consecutive time units correspond to the same uplink transmit mode.

Uplink transmissions corresponding to different transmit modes are not scheduled within the one time unit or the multiple consecutive time units.

In the embodiment, to prevent the terminal from frequent switching between uplink transmit modes which causes a processing delay, it may be semi-statically configured by the serving node that the terminal will not switch within a time period T. For example, a preset time T includes one time unit or multiple consecutive time units, and the serving node configures that the uplink transmissions within the one time unit or the multiple consecutive time units correspond to the same uplink transmit mode, thereby limiting that the terminal uses the same uplink transmission mode within the time period T and avoiding a switching delay. Specifically, it may be limited that the uplink transmissions within the time period T use an uplink transmit mode corresponding to an uplink transmission with a highest priority or use an uplink transmit mode corresponding to an uplink transmission with an earliest starting sending time. It is configured that the uplink transmissions within the one time unit or the multiple consecutive time units correspond to the same uplink transmit mode, so as to limit the uplink transmit mode in which the terminal sends the uplink transmission in various cases, where reference may be made to any one of the preceding embodiments.

In an embodiment, it may also be predefined by the system that the uplink transmissions within the one time unit or the multiple consecutive time units correspond to the same uplink transmit mode.

In an embodiment, the method further includes: configuring, via higher-layer signaling, that within one CG and within one time unit, an uplink transmission is supported to be sent on one CC, where the uplink transmission includes a PUCCH.

In the embodiment, the uplink transmission includes the PUCCH. In the scenario of CA, the serving node configures, via the higher-layer signaling, only one PUCCH group for the terminal within one CG and within one time unit, that is, only one CC can be used for sending the PUCCH. Specifically, within one CG, the serving node configures configuration information (Config) of the PUCCH only for a BWP of a Pcell and does not configure the Config of the PUCCH for a BWP of another cell, thereby avoiding the frequent switching between uplink transmit modes. It is configured that within one CG, the uplink transmission is supported to be sent on one CC, so as to limit a sending mechanism with which the terminal sends the uplink transmission in various cases, where reference may be made to any one of the preceding embodiments.

In an embodiment, it may also be predefined by the system that within one CG and within one time unit, the uplink transmission is supported to be sent on one CC, where the uplink transmission includes the PUCCH.

In an embodiment, the method further includes: configuring a preset time, where the preset time is used for indicating a minimum delay between an ending symbol of a previously sent uplink transmission and a starting symbol of a subsequently sent uplink transmission and includes a set number of time units.

In the embodiment, for the terminal with a limited number of uplink sending radio frequency links, uplink transmit antennas, or SRS resource ports, in the case where the terminal supports EN-DC, CA, or SUL, for example, the serving node dynamically schedules or semi-statically configures two uplink transmission for the terminal, that is, an uplink transmission 1 and an uplink transmission 2 are configured. If the number of ports for the uplink transmission 1 is different from the number of ports for the uplink transmission 2 and the switching delay between uplink transmit modes, which is semi-statically configured by the serving node for the terminal, is T, the serving node needs to ensure that a delay between an ending time unit of the uplink transmission 1 and a starting time unit of the uplink transmission 2 cannot be less than T. If the uplink transmissions to be sent by the terminal do not satisfy this condition, the terminal may send only one of the uplink transmission 1 or the uplink transmission 2. For example, only an uplink transmission with an earlier starting sending time is sent, or only an uplink transmission with a higher priority is sent. A priority may be configured by the serving node or predefined by the system. Additionally, the terminal may also change the uplink transmit mode of the uplink transmission 1 or the uplink transmission 2, so as to ensure that the uplink transmission 1 and the uplink transmission 2 are sent in the same uplink transmit mode, ensuring consistency with the processing of the serving node. The preset time is configured so as to limit the sending mechanism with which the terminal sends the uplink transmission, where reference may be made to any one of the preceding embodiments. In an embodiment, the preset time may also be predefined by the system, where the preset time is used for indicating the minimum delay between the ending symbol of the previously sent uplink transmission and the starting symbol of the subsequently sent uplink transmission and includes the set number of time units.

In the uplink transmission receiving method in the embodiment, the serving node configures the reference configuration, the preset time, and different sending mechanisms to limit the sending of the uplink transmission by the terminal and avoid the frequent switching, thereby ensuring the processing consistency between two ends and improving the communication efficiency and reliability.

Figure 3:
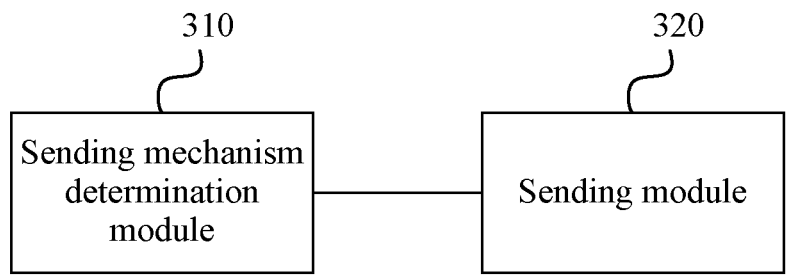
FIG. 3 is a structural diagram of an uplink transmission sending device according to an embodiment.

An embodiment of the present application further provides an uplink transmission sending device. FIG. 3 is a structural diagram of an uplink transmission sending device according to an embodiment. As shown in FIG. 3, the uplink transmission sending device includes a sending mechanism determination module 310 and a sending module 320.

The sending mechanism determination module 310 is configured to determine a sending mechanism of an uplink transmission according to an uplink transmit mode in the case of multiple carriers.

The sending module 320 is configured to send the uplink transmission according to the sending mechanism.

The uplink transmission sending device in the embodiment determines the sending mechanism according to the uplink transmit mode so that a terminal is limited to a certain extent in a process of sending an uplink transmission and will not switch the sending mechanism arbitrarily. In this manner, a serving node and the terminal maintain processing consistency, improving communication efficiency and reliability.

In an embodiment, the following is further included.

An uplink transmit mode corresponding to an uplink transmission scheduled by a PDCCH is determined according to information in the PDCCH for scheduling the uplink transmission.

In an embodiment, the uplink transmit mode is a mode in which uplink transmit resources are allocated among multiple carriers or carrier groups.

The uplink transmit resources include at least one of radio frequency links, transmit antennas, or antenna ports supported by an SRS resource.

In an embodiment, the uplink transmit mode includes a first mode and a second mode.

In the first mode, the uplink transmit resources are allocated to multiple uplink carriers or carrier groups.

In the second mode, the uplink transmit resources are all allocated to one uplink carrier or carrier group.

In an embodiment, in the first mode, the uplink transmit resources are equally allocated to the multiple uplink carriers or carrier groups.

In an embodiment, a first mode determination module is further included.

The first mode determination module is configured to determine the uplink transmit mode according to configuration information of a reference configuration.

In an embodiment, the first mode determination module is specifically configured to perform the step below.

The uplink transmit mode is determined to be the first mode for a time unit configured to be uplink in the reference configuration, and the uplink transmit mode is determined to be the second mode for a time unit configured to be non-uplink in the reference configuration.

Alternatively, the uplink transmit mode is determined to be the second mode for the time unit configured to be uplink in the reference configuration, and the uplink transmit mode is determined to be the first mode for the time unit configured to be non-uplink in the reference configuration.

The time unit includes at least one of a subframe, a slot, or an OFDM symbol.

In an embodiment, a second mode determination module is further included.

The second mode determination module is configured to determine that uplink transmissions within one time unit or multiple consecutive time units correspond to the same uplink transmit mode, where the time unit includes at least one of the subframe, the slot, or the OFDM symbol. In an embodiment, a third mode determination module is further included.

The third mode determination module is configured to: for the uplink transmissions within the one time unit or the multiple consecutive time units, determine the uplink transmit mode to be an uplink transmit mode received before a mode decision time point and corresponding to an uplink transmission scheduled by the PDCCH or configured via higher-layer signaling.

In an embodiment, a position of the mode decision time point is a preset number of OFDM symbols earlier than a starting OFDM symbol position of a first uplink transmission in the one time unit or the multiple consecutive time units; or the position of the mode decision time point is the preset number of OFDM symbols earlier than a starting OFDM symbol position of the one time unit or the multiple consecutive time units.

In an embodiment, a fourth mode determination module is further included.

The fourth mode determination module is configured to perform at least one of the steps below.

The uplink transmit mode corresponding to the uplink transmissions in the one time unit or the multiple consecutive time units is determined to be an uplink transmit mode corresponding to an uplink transmission having an earliest starting transmission time and scheduled by the PDCCH, activated by the PDCCH or configured via the higher-layer signaling.

The uplink transmit mode corresponding to the uplink transmissions in the one time unit or the multiple consecutive time units is determined to be an uplink transmit mode corresponding to an uplink transmission having a highest priority and scheduled by the PDCCH, activated by the PDCCH or configured via the higher-layer signaling.

The time unit includes at least one of the subframe, the slot, or the OFDM symbol.

In an embodiment, priorities of the uplink transmissions satisfy at least one of the following:

An uplink transmission scheduled or activated by the PDCCH has a higher priority than an uplink transmission configured via the higher-layer signaling, where the uplink transmission scheduled or activated by the PDCCH includes at least one of a PUSCH scheduled or activated by the PDCCH, a PUCCH scheduled by the PDCCH, or an SRS scheduled by the PDCCH, and the uplink transmission configured via the higher-layer signaling includes at least one of a PUSCH, PUCCH, PRACH, or SRS whose scheduling information is delivered via the higher-layer signaling.

An uplink transmission scheduled or activated in a DCI format A has a higher priority than an uplink transmission scheduled or activated in a DCI format B, where each of the DCI format A and the DCI format B includes at least one of a DCI format 0_0, a DCI format 0_1, or a DCI format 0_2.

An uplink transmission scheduled or activated by a PDCCH scrambled with an RNTI A has a higher priority than an uplink transmission scheduled or activated by a PDCCH scrambled with an RNTI B.

An uplink transmission carrying UCI has a higher priority than an uplink transmission carrying no UCI, where the uplink transmission includes an uplink physical channel.

For the uplink transmission configured via the higher-layer signaling, a PUCCH configured via the higher-layer signaling has a higher priority than a PUSCH configured via the higher-layer signaling.

For the uplink transmission configured via the higher-layer signaling, a PRACH configured via the higher-layer signaling has a higher priority than the PUSCH configured via the higher-layer signaling.

For the uplink transmission configured via the higher-layer signaling, the PRACH configured via the higher-layer signaling has a higher priority than the PUCCH configured via the higher-layer signaling.

For the uplink transmission configured via the higher-layer signaling, the PUCCH configured via the higher-layer signaling has a higher priority than an SRS configured via the higher-layer signaling.

For the uplink transmission configured via the higher-layer signaling, the PUSCH configured via the higher-layer signaling has a higher priority than the SRS configured via the higher-layer signaling.

The uplink transmission configured via the higher-layer signaling includes a periodic transmission and a semi-persistent transmission.

In an embodiment, a fifth mode determination module is further included.

The fifth mode determination module is configured to perform at least one of the steps below.

The uplink transmit mode corresponding to the uplink transmissions within the one time unit or the multiple consecutive time units is determined.

In the case where an initial uplink transmit mode of the uplink transmission is inconsistent with the determined uplink transmit mode, the uplink transmit mode of the uplink transmission is changed to the determined uplink transmit mode, or sending the uplink transmission is cancelled or delayed.

Uplink transmissions corresponding to different transmit modes are not sent within the one time unit or the multiple consecutive time units.

In an embodiment, in the case where the uplink transmit mode corresponding to the one time unit or the multiple consecutive time units is different from an uplink transmit mode corresponding to one time unit or multiple consecutive time units previous to and closest to the one time unit or the multiple consecutive time units, a mode switching delay exists between the one time unit or the multiple consecutive time units and the one time unit or the multiple consecutive time units previous to and closest to the one time unit or the multiple consecutive time units.

In an embodiment, in a case where the mode switching delay exists, the uplink transmissions within the one time unit or the multiple consecutive time units are sent after the mode switching delay.

The mode switching delay is earlier than a starting OFDM symbol of the one time unit or the multiple consecutive time units or earlier than a starting OFDM symbol of an uplink transmission sent earliest within the one time unit or the multiple consecutive time units.

In an embodiment, a sixth mode determination module is further included.

The sixth mode determination module is configured to perform at least one of the steps below.

In the case where the uplink transmission is sent on a first cell group or a first component carrier within the one time unit or the multiple consecutive time units, the uplink transmit mode corresponding to the one time unit or the multiple consecutive time units is determined to be the first mode.

In the case where a first type uplink transmission is sent on a second cell group or a second component carrier within the one time unit or the multiple consecutive time units, the uplink transmit mode corresponding to the one time unit or the multiple consecutive time units is determined to be the first mode.

In the case where a second type uplink transmission is sent on the second cell group or the second component carrier within the one time unit or the multiple consecutive time units, the uplink transmit mode corresponding to the one time unit or the multiple consecutive time units is determined to be the second mode.

In an embodiment, the sending mechanism determination module 310 is further configured to determine the sending mechanism according to configuration information, where the sending mechanism includes supporting, within one CG and within one time unit, an uplink transmission to be sent on one CC, where the uplink transmission includes the PUCCH.

In an embodiment, the initial uplink transmit mode of the uplink transmission is determined according to configuration information via the higher-layer signaling or scheduling indication information in the PDCCH.

In an embodiment, the sending mechanism determination module 310 is further configured to determine the sending mechanism according to the configuration information.

The sending mechanism includes that a delay between an ending symbol of a previously sent uplink transmission and a starting symbol of a subsequently sent uplink transmission is greater than or equal to a set number of time units, where the time unit is the subframe, the slot, a symbol, a microsecond, or a millisecond.

In an embodiment, the sending mechanism includes target information of the uplink transmission. The target information includes at least one of the number of transmit ports, a sequence number of a transmit port, a method for mapping transmit ports to transmit antennas, a method for mapping transmit ports to radio frequency links, or a method for mapping transmit ports to SRS resource ports.

In an embodiment, the method for mapping transmit ports to transmit antennas includes: mapping one transmit port to a specified number of transmit antennas.

The method for mapping transmit ports to radio frequency links includes: mapping one transmit port to a specified number of radio frequency links.

The method for mapping transmit ports to SRS resource ports includes: mapping one transmit port to a specified number of SRS resource ports.

The uplink transmission sending device provided in the embodiment and the uplink transmission sending method provided in the preceding embodiments belong to the same concept. For technical details not described in detail in the embodiment, reference may be made to any one of the preceding embodiments. The embodiment has the same beneficial effects as the uplink transmission sending method performed.

An embodiment of the present application further provides an uplink transmission receiving device.

Figure 4:
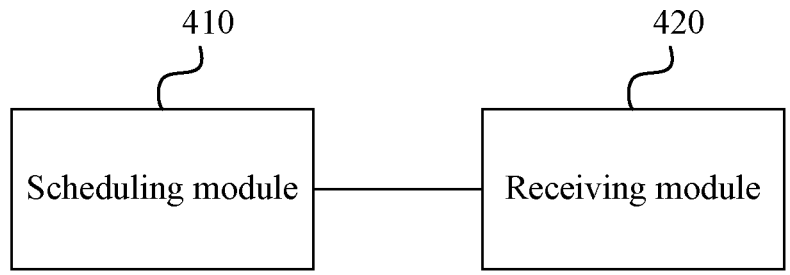
FIG. 4 is a structural diagram of an uplink transmission receiving device according to an embodiment.

FIG. 4 is a structural diagram of an uplink transmission receiving device according to an embodiment. As shown in FIG. 4, the uplink transmission receiving device includes a scheduling module 410 and a receiving module 420.

The scheduling module 410 is configured to send scheduling information, where the scheduling information is used for scheduling a terminal to send an uplink transmission according to an uplink transmit mode in the case of multiple carriers.

The receiving module 420 is configured to receive the uplink transmission.

The uplink transmission receiving device in the embodiment schedules the terminal so that the terminal determines a sending mechanism of the uplink transmission according to the uplink transmit mode in the case of multiple carriers and determines how to send the uplink transmission.

The process of the terminal sending the uplink transmission is limited by the uplink transmit mode without frequent switching so that a serving node can stably receive the uplink transmission sent by the terminal, ensuring the consistency between two ends and improving communication efficiency and reliability.

In an embodiment, a first configuration module is further included.

The first configuration module is configured to configure a reference configuration, where the reference configuration has a mapping relationship with the uplink transmit mode.

In an embodiment, a second configuration module is further included.

The second configuration module is configured to perform at least one of the steps below.

It is configured that uplink transmissions within one time unit or multiple consecutive time units correspond to the same uplink transmit mode.

Uplink transmissions corresponding to different transmit modes are not scheduled within the one time unit or the multiple consecutive time units.

In an embodiment, a third configuration module is further included.

The third configuration module is configured to configure, via higher-layer signaling, that within one CG and within one time unit, an uplink transmission is supported to be sent on one CC, where the uplink transmission includes a PUCCH.

In an embodiment, a fourth configuration module is further included.

The fourth configuration module is configured to configure a preset time, where the preset time is used for indicating a minimum delay between an ending symbol of a previously sent uplink transmission and a starting symbol of a subsequently sent uplink transmission and includes a set number of time units.

In an embodiment, the uplink transmit mode is a mode in which uplink transmit resources are allocated among multiple carriers or carrier groups.

The uplink transmit resources include at least one of radio frequency links, transmit antennas, or antenna ports supported by an SRS resource.

In an embodiment, the uplink transmit mode includes a first mode and a second mode.

In the first mode, the uplink transmit resources are allocated to multiple uplink carriers or carrier groups.

In the second mode, the uplink transmit resources are all allocated to one uplink carrier or carrier group.

In an embodiment, in the first mode, the uplink transmit resources are equally allocated to the multiple uplink carriers or carrier groups.

In an embodiment, the uplink transmission is sent by the terminal in the first mode for a time unit configured to be uplink in the reference configuration, and the uplink transmission is sent by the terminal in the second mode for a time unit configured to be non-uplink in the reference configuration; or the uplink transmission is sent by the terminal in the second mode for the time unit configured to be uplink in the reference configuration, and the uplink transmission is sent by the terminal in the first mode for the time unit configured to be non-uplink in the reference configuration.

The time unit includes at least one of a subframe, a slot, or an OFDM symbol.

In an embodiment, the following is further included.

For the uplink transmissions within the one time unit or the multiple consecutive time units, the uplink transmissions are sent by the terminal in the same uplink transmit mode, where the time unit includes at least one of the subframe, the slot, or the OFDM symbol.

In an embodiment, the following is further included.

For the uplink transmissions in the one time unit or the multiple consecutive time units, the uplink transmissions are sent by the terminal in an uplink transmit mode corresponding to an uplink transmission having an earliest starting transmission time and scheduled by a PDCCH, activated by the PDCCH or configured via higher-layer signaling.

For the uplink transmissions in the one time unit or the multiple consecutive time units, the uplink transmissions are sent by the terminal in an uplink transmit mode corresponding to an uplink transmission having a highest priority and scheduled by the PDCCH, activated by the PDCCH or configured via the higher-layer signaling.

The time unit includes at least one of the subframe, the slot, or the OFDM symbol.

In an embodiment, priorities of the uplink transmissions satisfy at least one of the following:

An uplink transmission scheduled or activated by the PDCCH has a higher priority than an uplink transmission configured via the higher-layer signaling, where the uplink transmission scheduled or activated by the PDCCH includes at least one of a PUSCH scheduled or activated by the PDCCH, a PUCCH scheduled by the PDCCH, or an SRS scheduled by the PDCCH, and the uplink transmission configured via the higher-layer signaling includes at least one of a PUSCH, PUCCH, PRACH, or SRS whose scheduling information is delivered via the higher-layer signaling.

An uplink transmission scheduled or activated in a DCI format A has a higher priority than an uplink transmission scheduled or activated in a DCI format B, where each of the DCI format A and the DCI format B includes at least one of a DCI format 0_0, a DCI format 0_1, or a DCI format 0_2.

An uplink transmission scheduled or activated by a PDCCH scrambled with an RNTI A has a higher priority than an uplink transmission scheduled or activated by a PDCCH scrambled with an RNTI B.

An uplink transmission carrying UCI has a higher priority than an uplink transmission carrying no UCI, where the uplink transmission includes an uplink physical channel.

For the uplink transmission configured via the higher-layer signaling, a PUCCH configured via the higher-layer signaling has a higher priority than a PUSCH configured via the higher-layer signaling.

For the uplink transmission configured via the higher-layer signaling, a PRACH configured via the higher-layer signaling has a higher priority than the PUSCH configured via the higher-layer signaling.

For the uplink transmission configured via the higher-layer signaling, the PRACH configured via the higher-layer signaling has a higher priority than the PUCCH configured via the higher-layer signaling.

For the uplink transmission configured via the higher-layer signaling, the PUCCH configured via the higher-layer signaling has a higher priority than an SRS configured via the higher-layer signaling.

For the uplink transmission configured via the higher-layer signaling, the PUSCH configured via the higher-layer signaling has a higher priority than the SRS configured via the higher-layer signaling.

The uplink transmission configured via the higher-layer signaling includes a periodic transmission and a semi-persistent transmission.

In an embodiment, the following is further included.

For the uplink transmissions within the one time unit or the multiple consecutive time units, in the case where an initial uplink transmit mode of the uplink transmission is inconsistent with an uplink transmit mode determined by the terminal, the terminal changes the initial uplink transmit mode of the uplink transmission to the determined uplink transmit mode and sends the uplink transmission in the changed uplink transmit mode, or the terminal cancels or delays sending the uplink transmission.

The uplink transmission receiving device provided in the embodiment and the uplink transmission receiving method provided in the preceding embodiments belong to the same concept. For technical details not described in detail in the embodiment, reference may be made to any one of the preceding embodiments. The embodiment has the same beneficial effects as the uplink transmission receiving method performed.

An embodiment of the present application further provides a terminal. The preceding uplink transmission sending method may be performed by an uplink transmission sending device which may be implemented by software and/or hardware and integrated in the terminal. The terminal may be a UE.

Figure 5:
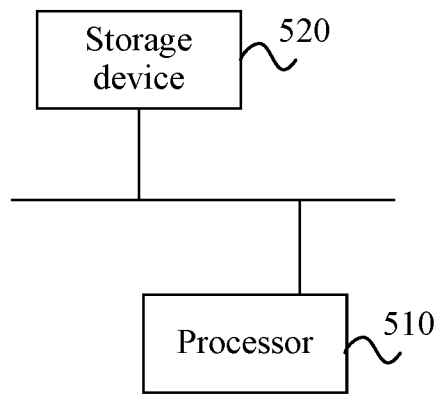
FIG. 5 is a structural diagram showing hardware of a terminal according to an embodiment.

FIG. 5 is a structural diagram of a terminal according to an embodiment. As shown in FIG. 5, the terminal provided in the embodiment includes a processor 510 and a storage device 520. The terminal may include one or more processors. One processor 510 is shown as an example in FIG. 5. The processor 510 and the storage device 520 in the terminal may be connected via a bus or in other manners. The connection via a bus is shown as an example in FIG. 5.

One or more programs are executed by one or more processors 510 to cause the one or more processors to perform the uplink transmission sending method in any one of the preceding embodiments.

As a computer-readable storage medium, the storage device 520 in the terminal may be configured to store one or more programs which may be software programs, computer-executable programs, and modules, such as program instructions/modules (for example, the modules in the uplink transmission sending device including a sending mechanism determination module 310 and a sending module 320, as shown in FIG. 3) corresponding to the uplink transmission sending method in embodiments of the present invention. The processor 510 executes software programs, instructions, and modules stored in the storage device 520 to perform various function applications and data processing of the terminal, that is, to perform the uplink transmission sending method in the preceding method embodiments.

The storage device 520 mainly includes a program storage region and a data storage region. The program storage region may store an operating system and an application program required by at least one function. The data storage region may store data (such as an uplink transmit mode and an uplink transmission in the preceding embodiments) created based on the use of the terminal. Additionally, the storage device 520 may include a high-speed random-access memory and may also include a nonvolatile memory, such as at least one magnetic dick memory, a flash memory, or another nonvolatile solid-state memory. In some examples, the storage device 520 may further include memories remotely disposed relative to the processor 510, and these remote memories may be connected to the terminal via a network. Examples of the preceding network include, but are not limited to, the Internet, an intranet, a local area network, a mobile communication network, and a combination thereof.

When the one or more programs included in the terminal are executed by the one or more processors 510, the following operations are performed: determining a sending mechanism of an uplink transmission according to an uplink transmit mode in the case of multiple carriers; and sending the uplink transmission according to the sending mechanism.

The terminal provided in the embodiment and the uplink transmission sending method provided in the preceding embodiments belong to the same concept. For technical details not described in detail in the embodiment, reference may be made to any one of the preceding embodiments. The embodiment has the same beneficial effects as the uplink transmission sending method performed. An embodiment of the present application further provides a serving node. The preceding uplink transmission receiving method may be performed by an uplink transmission receiving device which may be implemented by software and/or hardware and integrated in the serving node. The serving node may be a base station.

Figure 6:
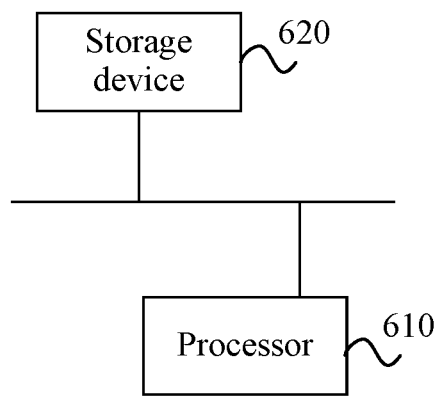
FIG. 6 is a structural diagram showing hardware of a serving node according to an embodiment.

FIG. 6 is a structural diagram of a serving node according to an embodiment. As shown in FIG. 6, the serving node provided in the embodiment includes a processor 610 and a storage device 620. The serving node may include one or more processors. One processor 610 is shown as an example in FIG. 6. The processor 610 and the storage device 620 in the serving node may be connected via a bus or in other manners. The connection via a bus is shown as an example in FIG. 6.

One or more programs are executed by one or more processors 610 to cause the one or more processors to perform the uplink transmission receiving method in any one of the preceding embodiments.

As a computer-readable storage medium, the storage device 620 in the serving node may be configured to store one or more programs which may be software programs, computer-executable programs, and modules, such as program instructions/modules (for example, the modules in the uplink transmission receiving device including a scheduling module 410 and a receiving module 420, as shown in FIG. 4) corresponding to the uplink transmission receiving method in embodiments of the present invention. The processor 610 executes software programs, instructions, and modules stored in the storage device 620 to perform various function applications and data processing of the serving node, that is, to perform the uplink transmission receiving method in the preceding method embodiments.

The storage device 620 mainly includes a program storage region and a data storage region. The program storage region may store an operating system and an application program required by at least one function. The data storage region may store data (such as an uplink transmission and scheduling information in the preceding embodiments) created based on the use of the serving node. Additionally, the storage device 620 may include a high-speed random-access memory and may also include a nonvolatile memory, such as at least one magnetic disk memory, a flash memory, or another nonvolatile solid-state memory. In some examples, the storage device 620 may further include memories remotely disposed relative to the processor 610, and these remote memories may be connected to the serving node via a network. Examples of the preceding network include, but are not limited to, the Internet, an intranet, a local area network, a mobile communication network, and a combination thereof.

When the one or more programs included in the serving node are executed by the one or more processors 610, the following operations are performed: sending scheduling information, where the scheduling information is used for scheduling a terminal to send an uplink transmission according to an uplink transmit mode in the case of multiple carriers; and receiving the uplink transmission.

The serving node provided in the embodiment and the uplink transmission receiving method provided in the preceding embodiments belong to the same concept. For technical details not described in detail in the embodiment, reference may be made to any one of the preceding embodiments. The embodiment has the same beneficial effects as the uplink transmission receiving method performed.

An embodiment of the present application further provides a storage medium including a computer-executable instruction. When executed by a computer processor, the computer-executable instruction causes the computer processor to perform an uplink transmission sending method or an uplink transmission receiving method.

From the preceding description of embodiments, it is apparent to those skilled in the art that the present application may be implemented by use of software and general-purpose hardware or may be implemented by hardware. Based on this understanding, the technical solutions of the present application may be embodied in the form of a software product. The computer software product may be stored in a computer-readable storage medium such as a floppy disk, a read-only memory (ROM), a random-access memory (RAM), a flash memory, a hard disk, or an optical disk of a computer and includes multiple instructions for causing a computer device (which may be a personal computer, a server, or a network device) to perform the method in any embodiment of the present application.

The preceding are only example embodiments of the present application and not intended to limit the scope of the present application.

A block diagram of any logic flow among the drawings of the present application may represent program steps, may represent interconnected logic circuits, modules, and functions, or may represent a combination of program steps with logic circuits, modules, and functions. A computer program may be stored in a memory. The memory may be of any type appropriate for a local technical environment and may be implemented by using any appropriate data storage technology, such as, but not limited to, a read-only memory (ROM), a random-access memory (RAM), and an optical memory device and system (digital video disc (DVD) or compact disk (CD)). Computer-readable media may include non-transitory storage media. A data processor may be of any type appropriate for the local technical environment, such as, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without deviating from the scope of the present application. Accordingly, the proper scope of the present application is determined according to the claims.

What is claimed is:
1. An uplink transmission sending method, comprising:
determining a sending mechanism of an uplink transmission according to an uplink transmit mode in a case of multiple carriers; and
sending the uplink transmission according to the sending mechanism;

wherein the uplink transmission sending method further comprises:
  determining the uplink transmit mode according to configuration information of a reference configuration;
  wherein a time unit comprises at least one of a subframe, a slot, or an orthogonal frequency-division multiplexing (OFDM) symbol;
  when the time unit is the OFDM symbol, the determining the uplink transmit mode according to the configuration information of the reference configuration comprises:
  determining the uplink transmit mode to be a first mode for the OFDM symbol configured to be uplink in the reference configuration, and determining the uplink transmit mode to be a second mode for the OFDM symbol configured to be non-uplink in the reference configuration; or
  determining the uplink transmit mode to be a second mode for the OFDM symbol configured to be uplink in the reference configuration, and determining the uplink transmit mode to be a first mode for the OFDM symbol configured to be non-uplink in the reference configuration;
  wherein the uplink transmit mode comprises a first mode and a second mode;
  when uplink transmit resources comprise antenna ports supported by a sounding reference signal (SRS) resource, in the first mode, each of two uplink carriers supports the uplink transmission in which one port is supported by the SRS resource, and in the second mode, one of the two uplink carriers supports uplink transmissions in which at most two ports are supported by the SRS resource, and the other of the two uplink carriers supports no uplink transmission.

2. The method of claim 1, further comprising:
  determining an uplink transmit mode corresponding to an uplink transmission scheduled by a physical downlink control channel (PDCCH) according to information in the PDCCH for scheduling the uplink transmission.

3. The method of claim 1, wherein the uplink transmit mode is a mode in which the uplink transmit resources are allocated among a plurality of carriers or carrier groups;
  wherein the uplink transmit resources comprise at least one of radio frequency links, transmit antennas, or antenna ports supported by an SRS resource.

4. The method of claim 1,
  wherein in the first mode, uplink transmit resources are allocated to a plurality of uplink carriers or carrier groups; and
  wherein in the second mode, the uplink transmit resources are all allocated to one uplink carrier or carrier group.

5. The method of claim 4, wherein in the first mode, the uplink transmit resources are equally allocated to the plurality of uplink carriers or carrier groups.

6. The method of claim 1, further comprising:
  determining that uplink transmissions within one time unit or a plurality of consecutive time units correspond to a same uplink transmit mode.

7. The method of claim 1, further comprising at least one of:
  determining an uplink transmit mode corresponding to uplink transmissions within one time unit or a plurality of consecutive time units; and
  in a case where an initial uplink transmit mode of the uplink transmission is inconsistent with the determined uplink transmit mode, changing the uplink transmit mode of the uplink transmission to the determined uplink transmit mode, or canceling or delaying sending the uplink transmission; or
  not sending uplink transmissions corresponding to different transmit modes within one time unit or a plurality of consecutive time units.

8. The method of claim 7, wherein the initial uplink transmit mode of the uplink transmission is determined according to configuration information via higher-layer signaling or scheduling indication information in a PDCCH.

9. The method of claim 1, wherein
  in a case where an uplink transmit mode corresponding to one time unit or a plurality of consecutive time units is different from an uplink transmit mode corresponding to one time unit or a plurality of consecutive time units previous to and closest to the one time unit or the plurality of consecutive time units, a mode switching delay exists between the one time unit or the plurality of consecutive time units and the one time unit or the plurality of consecutive time units previous to and closest to the one time unit or the plurality of consecutive time units.

10. The method of claim 9, wherein
  in a case where the mode switching delay exists, sending uplink transmissions within the one time unit or the plurality of consecutive time units after the mode switching delay;
  wherein the mode switching delay is earlier than a starting OFDM symbol of the one time unit or the plurality of consecutive time units or earlier than a starting OFDM symbol of an uplink transmission sent earliest within the one time unit or the plurality of consecutive time units.

11. The method of claim 1, further comprising at least one of:
  in a case where the uplink transmission is sent on a first cell group or a first component carrier within one time unit or a plurality of consecutive time units, determining an uplink transmit mode corresponding to the one time unit or the plurality of consecutive time units to be a first mode;
  in a case where a first type uplink transmission is sent on a second cell group or a second component carrier within one time unit or a plurality of consecutive time units, determining an uplink transmit mode corresponding to the one time unit or the plurality of consecutive time units to be a first mode; or
  in a case where a second type uplink transmission is sent on a second cell group or a second component carrier within one time unit or a plurality of consecutive time units, determining an uplink transmit mode corresponding to the one time unit or the plurality of consecutive time units to be a second mode.

12. The method of claim 1, wherein the sending mechanism comprises target information of the uplink transmission;
  wherein the target information comprises at least one of a number of transmit ports, a sequence number of a transmit port, a method for mapping transmit ports to transmit antennas, a method for mapping transmit ports to radio frequency links, or a method for mapping transmit ports to SRS resource ports.

13. The method of claim 12, wherein
  the method for mapping transmit ports to transmit antennas comprises: mapping one transmit port to a specified number of transmit antennas;

the method for mapping transmit ports to radio frequency links comprises: mapping one transmit port to a specified number of radio frequency links; or the method for mapping transmit ports to SRS resource ports comprises: mapping one transmit port to a specified number of SRS resource ports.

14. A non-transitory computer-readable storage medium, which is configured to store a computer program which, when executed by a processor, causes the processor to perform the uplink transmission sending method of claim 1.

15. An uplink transmission receiving method, comprising:
sending scheduling information, wherein the scheduling information is used for scheduling a terminal to send an uplink transmission according to an uplink transmit mode in a case of multiple carriers; and
receiving the uplink transmission;
wherein the uplink transmit mode is determined according to configuration information of a reference configuration;
wherein a time unit comprises at least one of a subframe, a slot, or an orthogonal frequency-division multiplexing (OFDM) symbol;
when the time unit is the OFDM symbol, the uplink transmit mode is determined according to configuration information of the reference configuration in the following manner:
determining the uplink transmit mode to be a first mode for the OFDM symbol configured to be uplink in the reference configuration, and determining the uplink transmit mode to be a second mode for the OFDM symbol configured to be non-uplink in the reference configuration; or
determining the uplink transmit mode to be a second mode for the OFDM symbol configured to be uplink in the reference configuration, and determining the uplink transmit mode to be a first mode for the OFDM symbol configured to be non-uplink in the reference configuration;
wherein the uplink transmit mode comprises a first mode and a second mode;
when uplink transmit resources comprise antenna ports supported by a sounding reference signal (SRS) resource, in the first mode, each of two uplink carriers supports the uplink transmission in which one port is supported by the SRS resource, and in the second mode, one of the two uplink carriers supports uplink transmissions in which at most two ports are supported by the SRS resource, and the other of the two uplink carriers supports no uplink transmission.

16. The method of claim 15, further comprising:
configuring a reference configuration, wherein the reference configuration has a mapping relationship with the uplink transmit mode.

17. The method of claim 15, further comprising at least one of:
configuring that uplink transmissions within one time unit or a plurality of consecutive time units correspond to a same uplink transmit mode; or
not scheduling uplink transmissions corresponding to different transmit modes within one time unit or a plurality of consecutive time units.

18. An uplink transmission sending device, comprising:
at least one processor; and
a storage device, which is configured to store at least one program;
wherein the at least one program is executed by the at least one processor to cause the at least one processor to perform an uplink transmission sending method, wherein the uplink transmission sending method comprising:
determining a sending mechanism of an uplink transmission according to an uplink transmit mode in a case of multiple carriers; and
sending the uplink transmission according to the sending mechanism;
wherein the uplink transmission sending method further comprises:
determining the uplink transmit mode according to configuration information of a reference configuration;
wherein a time unit comprises at least one of a subframe, a slot, or an orthogonal frequency-division multiplexing (OFDM) symbol;
when the time unit is the OFDM symbol, the determining the uplink transmit mode according to the configuration information of the reference configuration comprises:
determining the uplink transmit mode to be a first mode for the OFDM symbol configured to be uplink in the reference configuration, and determining the uplink transmit mode to be a second mode for the OFDM symbol configured to be non-uplink in the reference configuration; or
determining the uplink transmit mode to be a second mode for the OFDM symbol configured to be uplink in the reference configuration, and determining the uplink transmit mode to be a first mode for the OFDM symbol configured to be non-uplink in the reference configuration;
wherein the uplink transmit mode comprises a first mode and a second mode;
when uplink transmit resources comprise antenna ports supported by a sounding reference signal (SRS) resource, in the first mode, each of two uplink carriers supports the uplink transmission in which one port is supported by the SRS resource, and in the second mode, one of the two uplink carriers supports uplink transmissions in which at most two ports are supported by the SRS resource, and the other of the two uplink carriers supports no uplink transmission.

* * * * *